US011179821B2

(12) United States Patent
Sun et al.

(10) Patent No.: US 11,179,821 B2
(45) Date of Patent: Nov. 23, 2021

(54) SYNCHRONOUS SELF-LOCKING PNEUMATIC ADAPTIVE FIXTURE USED FOR THE MACHINING OF ANNULAR THIN-WALLED PARTS

(71) Applicant: DALIAN UNIVERSITY OF TECHNOLOGY, Liaoning (CN)

(72) Inventors: Yuwen Sun, Liaoning (CN); Jinjie Jia, Liaoning (CN); Zhuang Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/969,123

(22) PCT Filed: Sep. 5, 2019

(86) PCT No.: PCT/CN2019/104476
§ 371 (c)(1),
(2) Date: Aug. 11, 2020

(87) PCT Pub. No.: WO2021/035784
PCT Pub. Date: Mar. 4, 2021

(65) Prior Publication Data
US 2021/0170536 A1 Jun. 10, 2021

(30) Foreign Application Priority Data
Aug. 24, 2019 (CN) .......................... 201910786247.3

(51) Int. Cl.
*B23Q 3/06* (2006.01)
(52) U.S. Cl.
CPC ............ *B23Q 3/06* (2013.01); *B23Q 2703/04* (2013.01); *B23Q 2703/10* (2013.01)

(58) Field of Classification Search
CPC . B23Q 3/00; B23Q 3/06; B23Q 3/065; B23Q 3/082; B23Q 2703/04;
(Continued)

(56) References Cited

U.S. PATENT DOCUMENTS

2012/0174372 A1 7/2012 Dagenais

FOREIGN PATENT DOCUMENTS

| CN | 201552396 U | 8/2010 |
| CN | 101954604 A | 1/2011 |

(Continued)

OTHER PUBLICATIONS

CN-108907838-A Machine Translation. (Year: 2018).*
CN-104400305-A Machine Translation. (Year: 2015).*

*Primary Examiner* — Lee D Wilson
*Assistant Examiner* — Alberto Saenz
(74) *Attorney, Agent, or Firm* — Muncy, Geissler, Olds and Lowe, P.C.

(57) ABSTRACT

The invention discloses a synchronous self-locking pneumatic adaptive fixture used for the machining of annular thin-walled parts, belonging to the technical field of mechanical machining. The synchronous self-locking pneumatic adaptive fixture includes a zero point positioning system, a base body, a plurality of pressure plate mechanism assemblies, a plurality of columns, a plurality of support mechanism assemblies and a plurality of adaptive support body assemblies. Among them, the pressure plate mechanism assemblies complete the axial compression of the workpiece through the lever force increasing mechanisms and the orthogonal self-locking mechanisms. And the support mechanism assemblies complete the radial support of the workpiece through the rod slider mechanisms and the orthogonal self-locking mechanisms. The invention not only has high clamping efficiency and good stability, but also can (Continued)

ensure the reliable clamping and safe machining of the workpiece when the air source is disconnected.

2 Claims, 5 Drawing Sheets

(58) Field of Classification Search
CPC ... B23Q 2703/10; B23Q 1/0072; B25B 11/00; B25B 11/02
USPC .................................... 29/559, 281.1, 281.6
See application file for complete search history.

(56) References Cited

FOREIGN PATENT DOCUMENTS

| | | | |
|---|---|---|---|
| CN | 103264303 A | | 8/2013 |
| CN | 104400305 A | * | 3/2015 |
| CN | 104772626 A | | 7/2015 |
| CN | 106808246 A | | 6/2017 |
| CN | 206501034 U | | 9/2017 |
| CN | 108907838 A | * | 11/2018 |

* cited by examiner

SYNCHRONOUS SELF-LOCKING PNEUMATIC ADAPTIVE FIXTURE USED FOR THE MACHINING OF ANNULAR THIN-WALLED PARTS

FIELD OF THE INVENTION

The present invention relates to a fixture, in particular to a synchronous self-locking pneumatic adaptive fixture for the machining of annular thin-walled parts.

BACKGROUND OF THE INVENTION

With the continuous expansion of application fields and improvement of performance indicators, aerospace, energy power, national defense and other fields have higher requirements on the instruments and equipment used, and all kinds of structural parts are developing towards lightweight. Among them, annular thin-walled structures, as a typical structural part, are widely used because of their advantages of light weight and compact structure, such as aircraft engine casing, hub, etc. This kind of annular thin-walled parts have the characteristics of complex shape, large size and thin wall in the structural design, which is prone to instability or vibration due to the lack of rigidity in the machining, and it is difficult to ensure the machining accuracy of the workpiece. Therefore, for the clamping of annular thin-walled parts, in addition to requiring the fixture to provide the main positioning and clamping, it is also necessary to add auxiliary support to the weakly rigid part of the workpiece to improve its rigidity.

At present, the fixtures used in the machining of annular thin-walled parts mainly include:

(1) Traditional fixture. The structure of this kind of fixture is simple in design and low in price, but the operation is cumbersome, which requires manual adjustment of pressure plate and support one by one to complete the clamping. This method is not only labor-intensive, low in efficiency, but also difficult to ensure uniform clamping force. In addition, there are risks of missing clamp, too large or too small acting force in the clamping process.

(2) Hydraulic fixture. This kind of fixture has reliable clamping, good effect and mature technology, but it needs to be equipped with additional hydraulic station when it is used in the machining site, which increases the cost, and the leakage of hydraulic oil will cause environmental pollution.

(3) Pneumatic fixture. This kind of fixture has fast moving speed, stable movement and no pollution, but its working pressure is low, so it needs to increase its volume to achieve the expected clamping effect. In the fixture design, due to the limited clamping space, it is not only limited to the selection of cylinders, which is difficult to ensure the required output force, but also affects the fixture design and layout.

In addition, the common problems in the above fixtures are:

(1) The power supply pipeline limits the movement of NC machine. In the fixture design, the hydraulic/pneumatic pipeline should be able to avoid interference with the workpiece 7. For example, the common pipeline winding problem in the machining, it needs to modify the machine table and equip it with hydraulic/pneumatic gyrator, which not only affects the continuity of the machining of the workpiece 7 between different machine tools, but also is not conducive to cost control.

(2) Hydraulic/pneumatic circuit has pipeline fracture, power source gas/oil failure and other safety hazards, which will not only affect the machining accuracy of parts or lead to scrapping of parts, but also may cause life accidents.

SUMMARY OF THE INVENTION

In order to solve the problems in the existing technologies, the present invention provides a synchronous self-locking pneumatic adaptive fixture used for the machining of annular thin-wall parts. The fixture can not only efficiently complete the stable clamping of the workpiece 7, but also does not need to modify the machine tool, and can ensure the reliable clamping and safe machining of the workpiece 7 under the condition of disconnecting the air source.

To achieve the above purposes, the present invention adopts the following technical solutions:

The present invention relates to a synchronous self-locking pneumatic adaptive fixture used for the machining of annular thin-wall parts, including a zero point positioning system 1, a base body 2, a plurality of pressure plate mechanism assemblies 3, a plurality of columns 4, a plurality of support mechanism assemblies 5 and a plurality of adaptive support body assemblies 6. The base body 2, the pressure plate mechanism assemblies 3 and the columns 4 are fixed on the upper surface of the zero point positioning system 1. The columns 4 are sleeved with the support mechanism assemblies 5. The end of each support mechanism assembly 5 is hinged with an adaptive support body assembly 6. The efficient clamping of the annular thin-walled parts is realized by the pressure plate mechanism assemblies 3 and the support mechanism assemblies 5.

The zero point positioning system 1 includes a base plate 1-1, a working plate 1-2, a plurality of zero point positioners 1-3 and a plurality of zero point positioning joints 1-4. The base plate 1-1 is a circular thin plate structure, and five zero point positioners 1-3 are fixed on its upper surface along the circumference and the center. The zero point positioning joints 1-4 are installed on the bottom surface of the working plate 1-2. Each zero point positioner 1-3 is connected with a zero point positioning joint 1-4. The working plate 1-2 is fixed on the base plate 1-1. The base body 2, the pressure plate mechanism assemblies 3 and the columns 4 are fixed on the upper surface of the working plate 1-2.

The base body 2 includes a plurality of support columns 2-1, a base 2-2 and a positioning ring 2-3. The working plate 1-2 and the base 2-2 are connected by the support columns 2-1. The base 2-2 is an annular plate structure, which is connected with the positioning ring 2-3 by bolts.

The pressure plate mechanism assemblies 3 include a plurality of pressure plate gas-path structures 3-1 and a plurality of pressure plate boosting orthogonal self-locking mechanisms 3-2. The compressed air is supplied to the pressure plate gas-path structures 3-1 so that they can push the pressure plate boosting orthogonal self-locking mechanisms 3-2 to achieve synchronous pressing of the pressure plates. After the completion of pressing, the air source can be disconnected. And the workpiece 7 can be reliably pressed with the help of the pressure plate boosting orthogonal self-locking mechanisms 3-2.

The pressure plate gas-path structures 3-1 include a plurality of cylinders a 3-101, a plurality of cylinder mounting frames 3-102, a plurality of speed control valves a 3-103, a plurality of joints 3-104, a plurality of joint brackets 3-105, a mounting plate 3-106, a plurality of mounting plate columns 3-107, a manual reversing valve 3-108, a plurality of relief valves 3-109, a plurality of relief valve mounting frames 3-110 and a plurality of rapid exhaust valves 3-111. The cylinders a 3-101 are double-acting cylinders, which are symmetrically fixed on the upper surface of the working plate 1-2 through the cylinder mounting frames 3-102. The output end of the cylinders a 3-101 point to the base body 2. The speed control valves a 3-103 are installed in the exhaust port of the cylinders a 3-101. There are four joint brackets 3-105, which are symmetrically mounted on the upper surface of the mounting plate 3-106. The joints 3-104 are fixed on the joint brackets 3-105 in series. There are four mounting plate columns 3-107, one end of each column is fixed on the upper surface of the working plate 1-2 by bolts, and the other end is fixed on the lower surface of the mounting plate 3-106. The manual reversing valve 3-108 is a three-position, five-way, middle-sealed manual reversing valve, which is fixed on the edge of the working plate 1-2 by bolts. Each cylinder a 3-101 is equipped with a relief valve 3-109 which is fixed on the relief valve mounting frame 3-110. The relief valve mounting frames 3-110 are fixed on the upper surface of the mounting plate 3-106 by bolts. There are eight rapid exhaust valves 3-111, which are symmetrically fixed on the upper surface of the mounting plate 3-106.

The pressure plate boosting orthogonal self-locking mechanisms 3-2 have a total of N, which are hinged with the piston rod of the cylinders a 3-101, and are carried out in the way of combining the lever force increasing mechanisms and the orthogonal self-locking mechanisms. Each pressure plate boosting orthogonal self-locking mechanism 3-2 includes a T-shaped pressure plate 3-201, an upper connecting rod 3-202, a connecting rod 3-203, a lower connecting rod 3-204, five connecting rod pins a 3-205, an auxiliary rod 3-206, a T-shaped pressure plate mounting column 3-207 and an auxiliary rod mounting column 3-208. The T-shaped pressure plate mounting column 3-207 is fixed on the upper surface of the positioning ring 2-3 by bolts. The T-shaped pressure plate 3-201 is hinged with the upper end of the T-shaped pressure plate mounting column 3-207 through the connecting rod pin a 3-205 in the pin hole of middle fulcrum, and the position of the fulcrum is determined according to the size of pressing force. The non-pressing end of the T-shaped pressure plate 3-201 is hinged with the end of the upper connecting rod 3-202 by the connecting rod pin a 3-205. The other end of the upper connecting rod 3-202 and the end of the lower connecting rod 3-204 are hinged together with the connecting rod 3-203 by the connecting rod pin a 3-205. The other end of the lower connecting rod 3-204 is hinged with one end of the auxiliary rod 3-206 by the connecting rod pin a 3-205, and the other end of the auxiliary rod 3-206 is hinged with the top of the auxiliary rod mounting column 3-208. The auxiliary rod mounting column 3-208 is mounted on the upper surface of the working plate 1-2.

The column 4 is a stepped structure, and the bottom of the column 4 is a plate structure, which is fixed on the upper surface of the working plate 1-2 by bolts. The top of the column 4 passes through the cylinder mounting plate 5-102 and is fixed. The support mechanism assemblies 5 are sleeved on the columns 4.

The support mechanism assemblies 5 include a plurality of support gas-path structures 5-1 and a plurality of support synchronous orthogonal self-locking mechanisms 5-2. The compressed air is supplied to the support gas-path structures 5-1 so that they can push the support synchronous orthogonal self-locking mechanisms 5-2 to achieve synchronous expansion and contraction of the supports. After the completion of supporting, the air source can be disconnected. And the workpiece 7 can be reliably supported with the help of the support synchronous orthogonal self-locking mechanisms 5-2.

The support gas-path structures 5-1 include a cylinder b 5-101, a cylinder mounting plate 5-102, an anti-speed-out system SSC valve 5-103, a speed control valve b 5-104 and a speed control valve bracket 5-105. The cylinder mounting plate 5-102 is an annular plate installed on the top of the columns 4. The cylinder b 5-101 is a double-acting cylinder, which is fixed on the upper surface of the cylinder mounting plate 5-102 by bolts, and the piston rod of the cylinder b 5-101 passes through the cylinder mounting plate 5-102. The speed control valve b 5-104 is fixed on the upper surface of the cylinder mounting plate 5-102 through the speed control valve bracket 5-105. The anti-speed-out system SSC valve 5-103 is fixed on the upper surface of the cylinder mounting plate 5-102.

The support synchronous orthogonal self-locking mechanisms 5-2 are carried out in the way of combining the rod slider mechanisms and the orthogonal self-locking mechanisms. The support synchronous orthogonal self-locking mechanisms 5-2 include a branch ring 5-201, two nuts 5-202, a plurality of connecting rod pins b 5-203, a plurality of connecting rods 5-204, a plurality of sliders 5-205 and a slider support ring 5-206. The branch ring 5-201 is fixed on the piston rod end of the cylinder b 5-101 by the nuts 5-202. One end of each connecting rod 5-204 is hinged with a slider 5-205 through a connecting rod pin b 5-203, and the other end is hinged with the branch ring 5-201 through a connecting rod pin b 5-203. The slider support ring 5-206 is an annular structure, which is fixed in the middle of the column 4 by nuts. The slider support ring 5-206 has N radial holes for mounting the slider 5-205.

The adaptive support body assemblies 6 include a plurality of auxiliary support frames 6-1, a plurality of rubber support bodies 6-2 and a plurality of support fixing pins 6-3. The auxiliary support frames 6-1 are T-shaped. The support end of each auxiliary support frame 6-1 is connected with two rubber support bodies 6-2. The non-support end of each auxiliary support frame 6-1 is hinged with the end of a slide 5-205 through a support fixing pin 6-3. During the machining of the workpiece 7, the adaptive support body assemblies 6 can be rotated within a certain range to ensure an effective fit with the inner wall of the workpiece 7.

The number N of the connecting rods 5-204 is a natural number, and N≥6, which is determined according to the diameter of the supporting part of the annular thin-walled parts.

The beneficial effects of the invention:
(1) In the invention, the orthogonal self-locking mechanism is adopted to realize the stable clamping of the workpiece 7, which can not only avoid the modification of the machine tool, but also ensure that the workpiece 7 is in a stable state for a long time in a zero energy consumption mode when the gas source is disconnected.
(2) In the invention, under the joint action of multiple sets of cylinders a 3-101 and the lever force increasing mechanisms, the pressure plate mechanism assemblies 3 can not only quickly, synchronously and stably press the workpiece 7 to avoid the risk of missing clamp, excessive or small clamping force, but also realize the amplification of force in a limited workspace, so as to ensure that the pressure plates can provide sufficient pressing force.
(3) In the invention, multiple sets of supports are arranged in a radial array mode. Under the joint action of the cylinder b 5-101 and the rod slider mechanisms, it can not only efficiently complete the synchronous expansion and contraction of the supports, but also provide the uniform support force from inside to outside along the circumferential direction for the annular thin-walled parts.

(4) The zero point positioning system 1 is adopted in the invention, which can not only greatly reduce the auxiliary time of the fixture alignment, but also ensure the continuity of the work of the workpiece 7 between different stations, processes and machine tools, thereby improving the utilization rate of the machine tools.

(5) The gas-path structure design of the invention adopts a plurality of valve body combination modes, which can not only avoid the damage of the workpiece 7 due to the rapid extension of the cylinders during the pressing of the pressure plates and the protruding of the supports, but also exhaust air quickly during the loosening of the pressure plates and the retracting of the supports, thereby improving the efficiency of unloading the workpiece 7.

(6) In the invention, the support adopts a rotating structure, which can be partially oscillated according to the force during the machining to realize adaptive support. It can not only make it fully fit with the inner wall of the annular thin-walled part, thereby enhancing the rigidity of the local weak position, but also make the supporting force always follow the normal direction of the supporting portion during the machining, thereby effectively suppressing the machining deformation and vibration of the workpiece 7, and ensuring the machining quality and precision.

(7) In the invention, the medium used in the working process is air, which is cheap and pollution-free, and is in line with the environmentally friendly machining concept.

(8) The noise generated by machining in the invention can be controlled to create a pleasant human-machine interaction environment.

In the figure: 1 zero point positioning system; 2 base body; 3 pressure plate mechanism assembly; 4 column; 5 support mechanism assembly; 6 adaptive support body assembly; 7 workpiece; 8 two-position three-way manual reversing valve; 1-1 base plate; 1-2 working plate; 1-3 zero point positioner; 1-4 zero point positioning joint; 2-1 support column; 2-2 base; 2-3 positioning ring; 3-1 pressure plate gas-path structure; 3-2 pressure plate boosting orthogonal self-locking mechanism; 3-101 cylinder a; 3-102 cylinder mounting frame; 3-103 speed control valve a; 3-104 joint; 3-105 joint bracket; 3-106 mounting plate; 3-107 mounting plate column; 3-108 manual reversing valve; 3-109 relief valve; 3-110 relief valve mounting frame; 3-111 rapid exhaust valve; 3-201 T-shaped pressure plate; 3-202 upper connecting rod; 3-203 connecting rod; 3-204 lower connecting rod; 3-205 connecting rod pin a; 3-206 auxiliary rod; 3-207 T-shaped pressure plate mounting column; 3-208 auxiliary rod mounting column; 5-1 support gas-path structure; 5-2 support synchronous orthogonal self-locking mechanism; 5-101 cylinder b; 5-102 cylinder mounting plate; 5-103 anti-speed-out system SSC valve; 5-104 speed control valve b; 5-105 speed control valve bracket; 5-201 branch ring; 5-202 nut; 5-203 connecting rod pin b; 5-204 connecting rod; 5-205 slider; 5-206 slider support ring; 6-1 auxiliary support frame; 6-2 rubber support body; 6-3 support fixing pin.

DETAILED DESCRIPTION

The present invention will be further described in detail below with reference to the accompanying drawings. The description in the section is only exemplary and explanatory, and does not limit the protection scope of the present invention in any way.

The embodiment of the invention provides a synchronous self-locking pneumatic adaptive fixture used for the machining of annular thin-walled parts.

Figure 1:
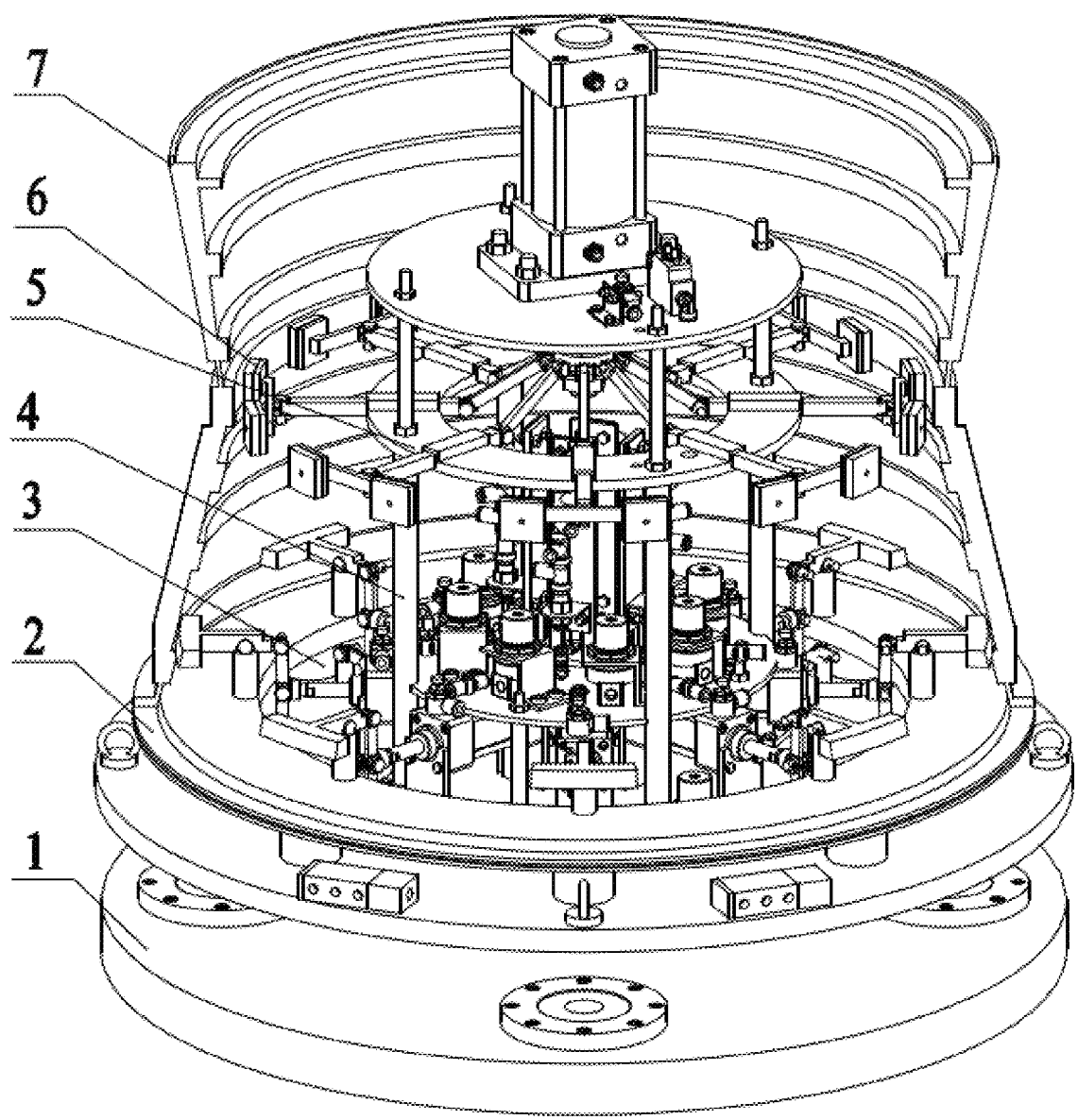
FIG. 1 is a three-dimensional model diagram of the present invention.

Referring to FIG. 1, a synchronous self-locking pneumatic adaptive fixture used for the machining of annular thin-walled parts includes a zero point positioning system 1, a base body 2, a plurality of pressure plate mechanism assemblies 3, a plurality of columns 4, a plurality of support mechanism assemblies 5 and a plurality of adaptive support body assemblies 6. The base body 2, the pressure plate mechanism assemblies 3 and the columns 4 are fixed on the upper surface of the zero point positioning system 1. The columns 4 are sleeved with the support mechanism assemblies 5. The end of each support mechanism assembly 5 is hinged with an adaptive support body assembly 6. The efficient clamping of the annular thin-walled part is realized by the pressure plate mechanism assemblies 3 and the support mechanism assemblies 5.

Figure 2:
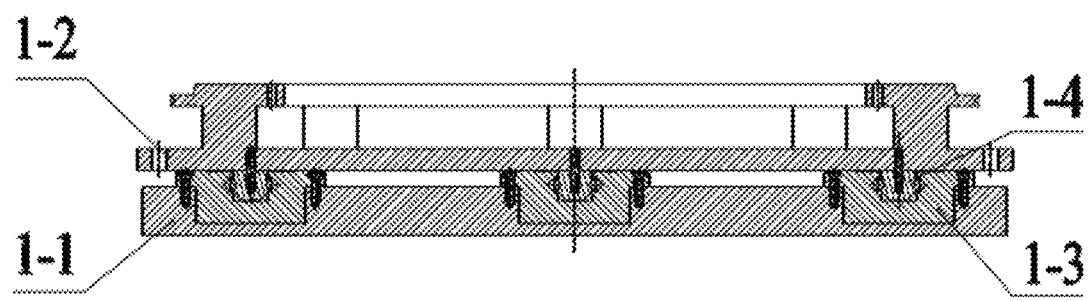
FIG. 2 is a sectional view of the zero point positioning system of the present invention.

Referring to FIG. 2, the zero point positioning system 1 includes a base plate 1-1, a working plate 1-2, a plurality of zero point positioners 1-3 and a plurality of zero point positioning joints 1-4. The base plate 1-1 is a circular thin plate structure, and five zero point positioners 1-3 are fixed on its upper surface along the circumference and the center. The zero point positioning joints 1-4 are installed on the bottom surface of the working plate 1-2. Each zero point positioner 1-3 is connected with a zero point positioning joint 1-4. The working plate 1-2 is fixed on the base plate 1-1. The base body 2, the pressure plate mechanism assemblies 3 and the columns 4 are fixed on the upper surface of the working plate 1-2.

Figure 3:
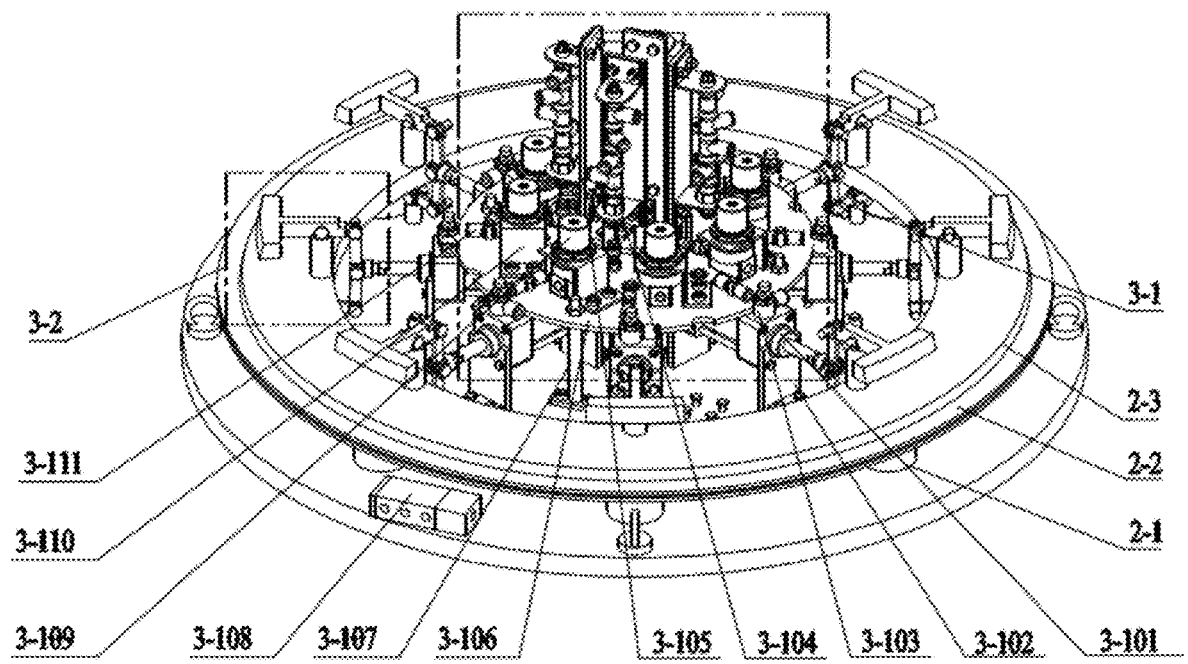
FIG. 3 is a schematic diagram of the pressure plate mechanism assemblies of the present invention.

Referring to FIG. 3, the base body 2 includes a plurality of support columns 2-1, a base 2-2 and a positioning ring 2-3. The working plate 1-2 and the base 2-2 are connected by the support columns 2-1. The base 2-2 is an annular plate structure, which is connected with the positioning ring 2-3 by bolts.

Figure 4:
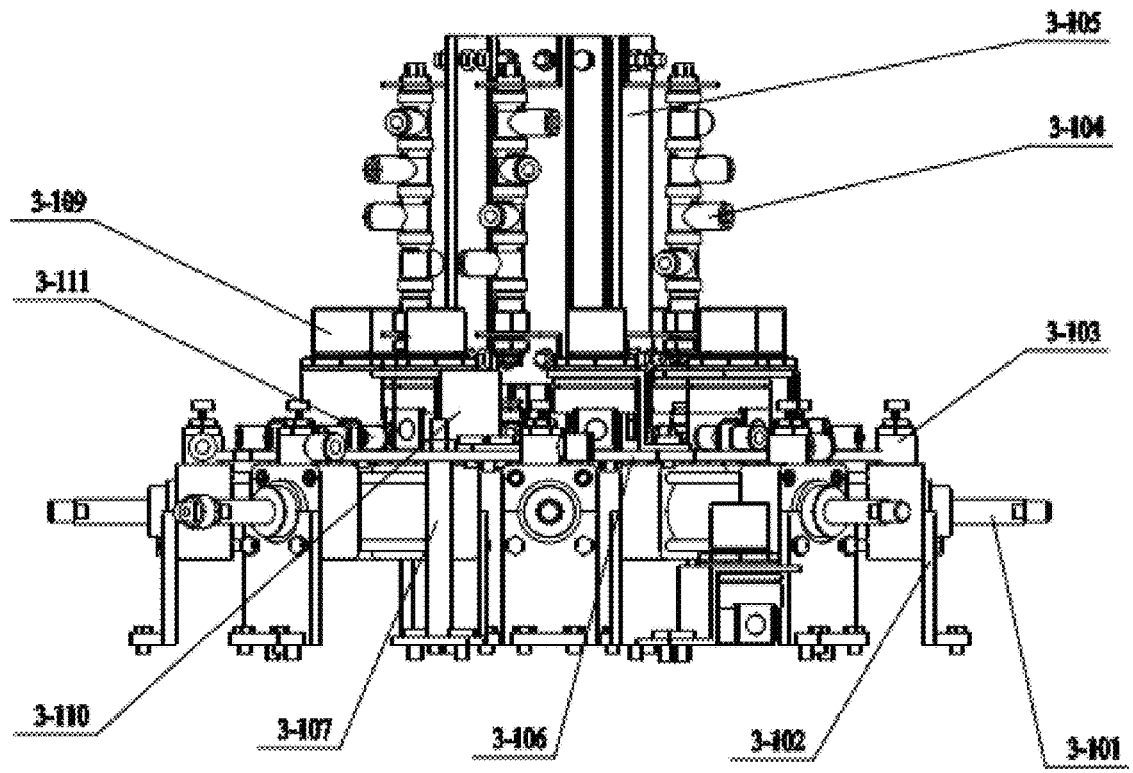
FIG. 4 is a schematic diagram of the pressure plate gas-path structures of the present invention.
Figure 5:
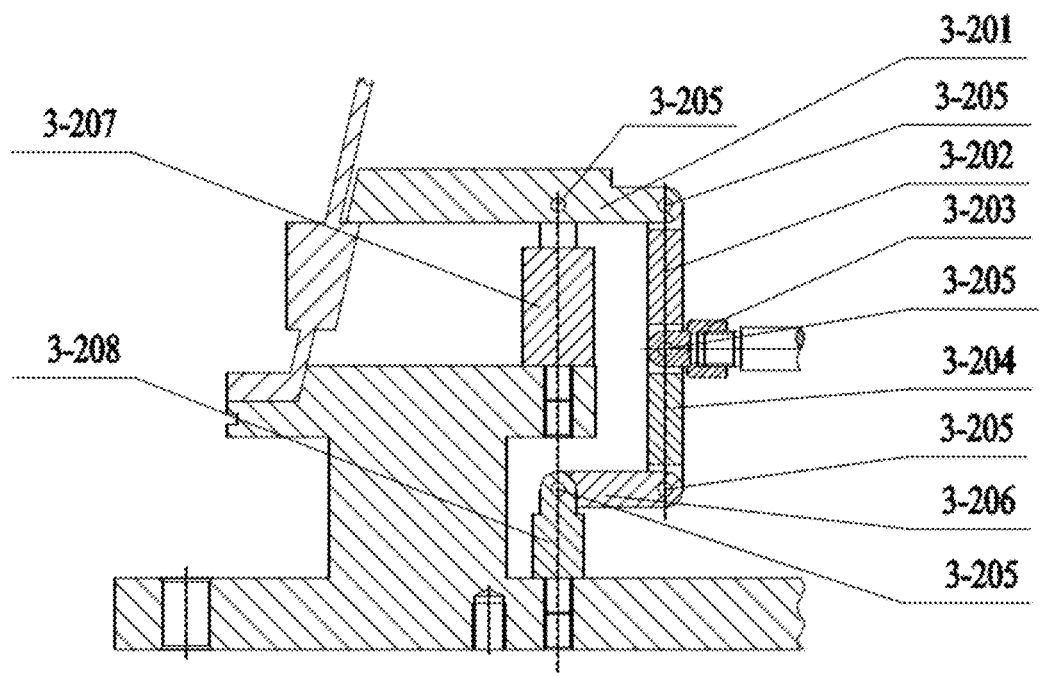
FIG. 5 is a sectional view of the pressure plate of the present invention in a pressed state.
Figure 6:
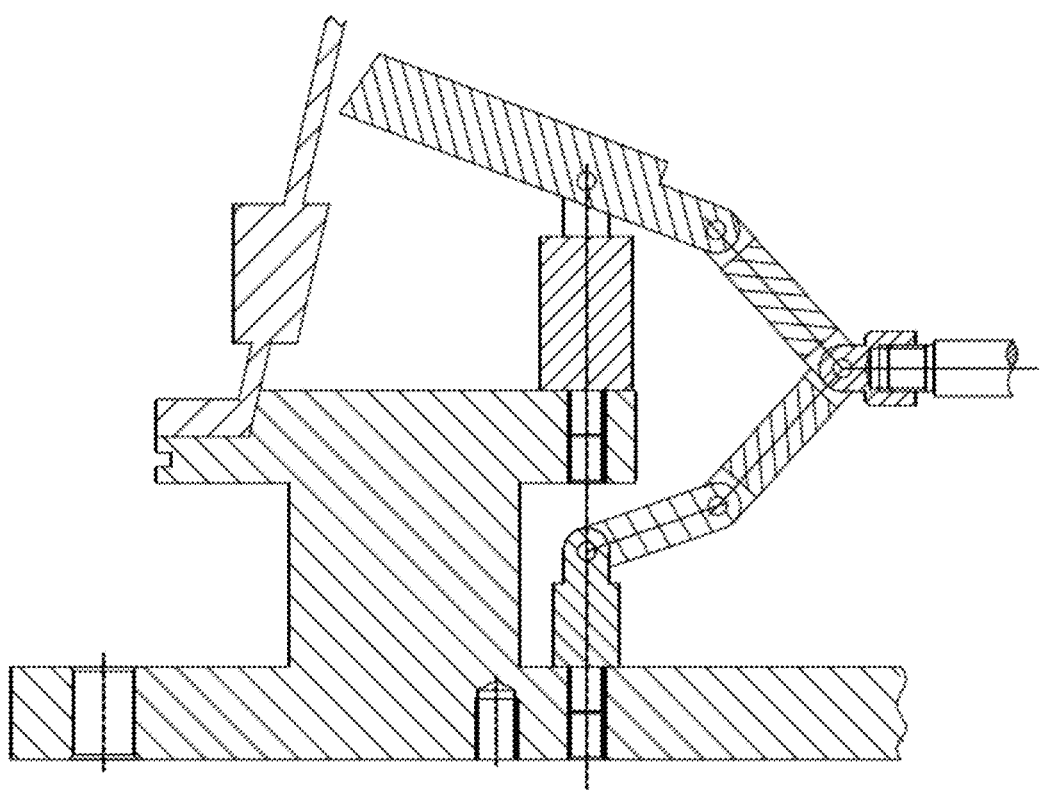
FIG. 6 is a sectional view of the pressure plate of the present invention in a released state.

Referring to FIG. 3 and FIG. 4, the pressure plate mechanism assemblies 3 include a plurality of pressure plate gas-path structures 3-1 and a plurality of pressure plate boosting orthogonal self-locking mechanisms 3-2. In the process of pressing, the compressed air is supplied to the pressure plate gas-path structures 3-1 so that they can push the pressure plate boosting orthogonal self-locking mechanisms 3-2 to achieve synchronous pressing of the pressure plates. After the completion of pressing, the air source can be disconnected. And the workpiece 7 can be reliably pressed with the help of the pressure plate boosting orthogonal self-locking mechanisms 3-2.

In the process of pressing, the compressed air is connected from the intake port of manual reversing valve 3-108 through the air pipe to the relief valves 3-109, the joints 3-104, the rapid exhaust valves 3-111 and the intake port of cylinders a 3-101 successively, thereby driving the piston rods of the cylinders a 3-101 to extend. In the process of releasing, the compressed air is connected from the intake port of manual reversing valve 3-108 through the air pipe to the joints 3-104, the speed control valves a 3-103 and the exhaust port of cylinders a 3-101 successively, thereby driving the piston rods of the cylinders a 3-101 to retract. During the exhaust process, the compressed air in the circuit is no longer discharged through the manual reversing valve 3-108, but directly from the rapid exhaust valves 3-111.

Referring to FIG. 3, FIG. 5, FIG. 6 and FIG. 10, the pressure plate boosting orthogonal self-locking mechanisms 3-2 have a total of N, which are hinged with the piston rod of the cylinders a 3-101, and are carried out in the way of combining the lever force increasing mechanisms and the orthogonal self-locking mechanisms. Each pressure plate boosting orthogonal self-locking mechanism 3-2 includes a T-shaped pressure plate 3-201, an upper connecting rod 3-202, a connecting rod 3-203, a lower connecting rod 3-204, five connecting rod pins a 3-205, an auxiliary rod 3-206, a T-shaped pressure plate mounting column 3-207 and an auxiliary rod mounting column 3-208. The T-shaped pressure plate mounting column 3-207 is fixed on the upper surface of the positioning ring 2-3 by bolts. The T-shaped pressure plate 3-201 is hinged with the upper end of the T-shaped pressure plate mounting column 3-207 through the connecting rod pin a 3-205 in the pin hole of middle fulcrum, and the position of the fulcrum is determined according to the size of pressing force. The non-pressing end of the T-shaped pressure plate 3-201 is hinged with the end of the upper connecting rod 3-202 by the connecting rod pin a 3-205. The other end of the upper connecting rod 3-202 and the end of the lower connecting rod 3-204 are hinged together with the connecting rod 3-203 by the connecting rod pin a 3-205. The other end of the lower connecting rod 3-204 is hinged with one end of the auxiliary rod 3-206 by the connecting rod pin a 3-205, and the other end of the auxiliary rod 3-206 is hinged with the top of the auxiliary rod mounting column 3-208. The auxiliary rod mounting column 3-208 is mounted on the upper surface of the working plate 1-2.

In the process of pressing, the piston rods of cylinders a 3-101 push the connecting rods 3-203 to move horizontally. The upper connecting rods 3-202 and the lower connecting rods 3-204 move in the vertical direction under the hinge action of the connecting rods 3-203. When the connecting rods 3-203 move across the critical point in the horizontal direction, the T-shaped pressure plates 3-201 achieve self-locking. The force is amplified under the action of the lever, thereby ensuring that the T-shaped pressure plates 3-201 press the workpiece 7 tightly. Through the orthogonal structure design, the occurrence of pressure instability caused by the compressibility of the gas when the cylinder piston rod and the pressing force are in the same direction can be avoided, and the pressing state can be safely and reliably maintained for a long time in a zero energy consumption manner. In the process of releasing, the retraction of piston rods of the cylinders a 3-101 drive the connecting rods 3-203 to move horizontally, so that they reversely cross the critical point to complete the reset.

Figure 7:
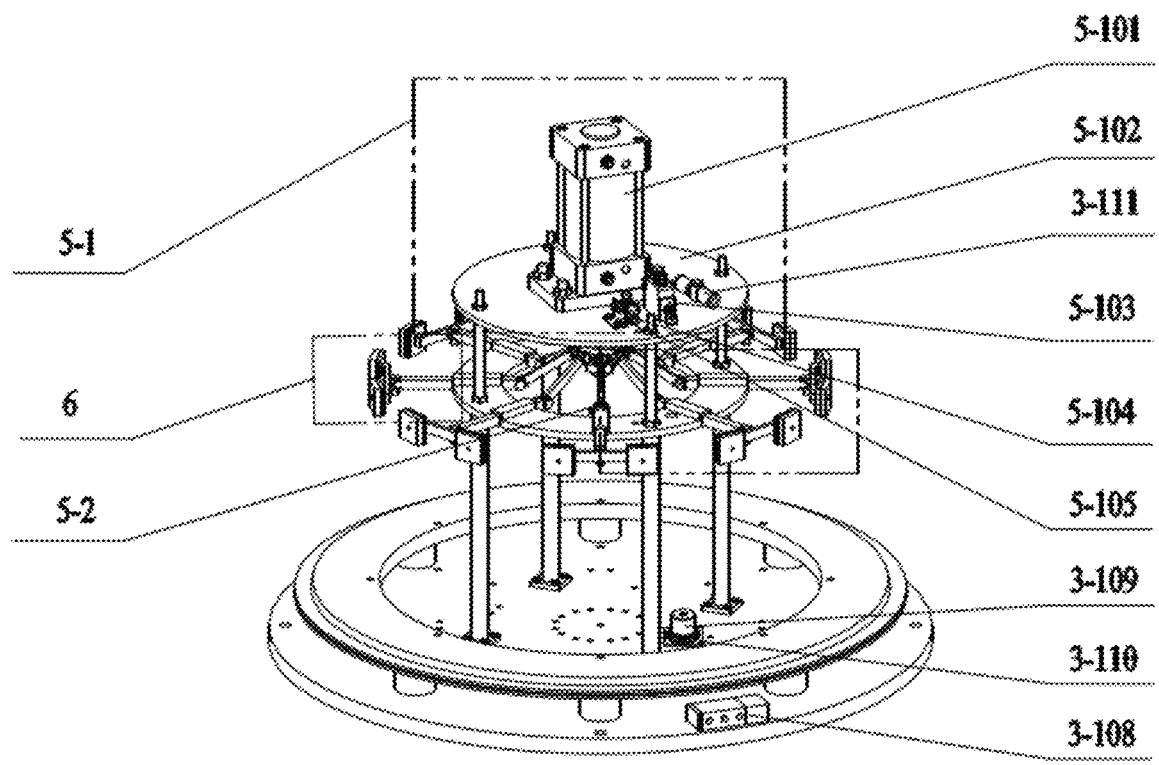
FIG. 7 is a schematic diagram of the support mechanism assemblies of the present invention.
Figure 8:
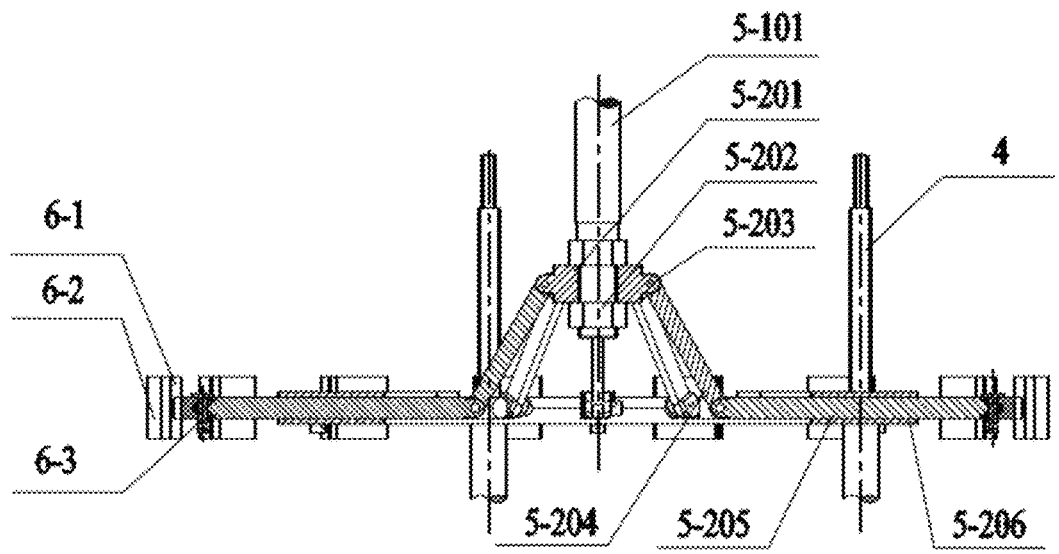
FIG. 8 is a sectional view of the supports of the present invention in an extended state.
Figure 9:
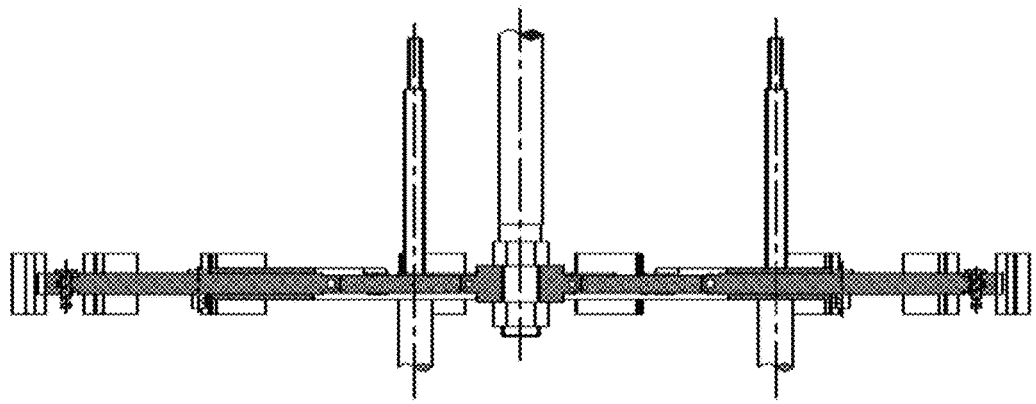
FIG. 9 is a sectional view of the supports of the present invention in a retracted state.
Figure 10:
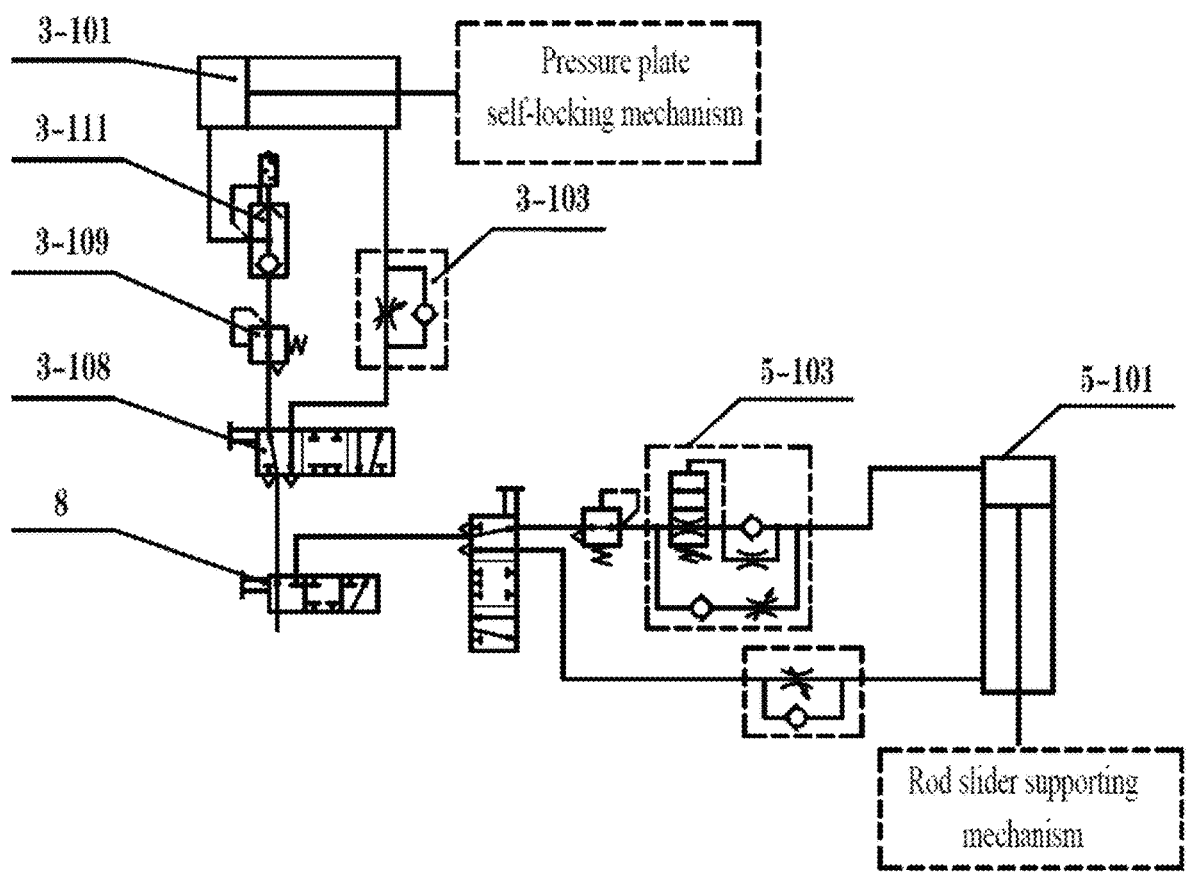
FIG. 10 is a pneumatic circuit diagram of the system of the present invention.

Referring to FIG. 7, the column 4 is a stepped structure, and the part below the support mechanism assembly 5 is a plate structure with through holes at the bottom, and the part above the support mechanism assembly 5 is a cylindrical structure. The bottom of the column 4 is fixed on the upper surface of the working plate 1-2 by threaded connection, and the top of the column 4 passes through the cylinder mounting plate 5-102 and is fixed and the support mechanism assemblies 5 are sleeved on the columns 4.

The support mechanism assemblies 5 include a plurality of support gas-path structures 5-1 and a plurality of support synchronous orthogonal self-locking mechanisms 5-2. In the process of supporting, the compressed air is supplied to the support gas-path structures 5-1 so that they can push the support synchronous orthogonal self-locking mechanisms 5-2 to achieve synchronous expansion and contraction of the supports. After the completion of supporting, the air source can be disconnected. And the workpiece 7 can be reliably supported with the help of the support synchronous orthogonal self-locking mechanisms 5-2.

The support gas-path structures 5-1 include a cylinder b 5-101, a cylinder mounting plate 5-102, an anti-speed-out system SSC valve 5-103, a speed control valve b 5-104 and a speed control valve bracket 5-105. The cylinder mounting plate 5-102 is an annular plate installed on the top of the columns 4. The cylinder b 5-101 is a double-acting cylinder, which is fixed on the upper surface of the cylinder mounting plate 5-102 by bolts, and the piston rod of the cylinder b 5-101 passes through the cylinder mounting plate 5-102. The speed control valve b 5-104 is fixed on the upper surface of the cylinder mounting plate 5-102 through the speed control valve bracket 5-105. The anti-speed-out system SSC valve 5-103 is fixed on the upper surface of the cylinder mounting plate 5-102.

Referring to FIG. 7, FIG. 8, FIG. 9 and FIG. 10, during the extension of the support mechanism assemblies 5, the compressed air is connected from the intake port of manual reversing valve 3-108 through the air pipe to the relief valve 3-109, the anti-speed-out system SSC valve 5-103, the rapid exhaust valve 3-111 and the intake port of cylinder b 5-101 successively, thereby driving the piston rod of the cylinder b 5-101 to extend. During the retraction of supports, the compressed air is connected from the intake port of manual reversing valve 3-108 through the air pipe to the speed control valve b 5-104 and the exhaust port of cylinder b 5-101 successively, thereby driving the piston rod of the cylinder b 5-101 to retract. During the exhaust process, the compressed air in the circuit is no longer discharged from the manual reversing valve 3-108, but directly from the rapid exhaust valve 3-111.

The support synchronous orthogonal self-locking mechanisms 5-2 are carried out in the way of combining the rod slider mechanisms and the orthogonal self-locking mechanisms. The support synchronous orthogonal self-locking mechanisms 5-2 include a branch ring 5-201, two nuts 5-202, a plurality of connecting rod pins b 5-203, a plurality of connecting rods 5-204, a plurality of sliders 5-205 and a slider support ring 5-206. The branch ring 5-201 is fixed on the piston rod end of the cylinder b 5-101 by the nuts 5-202. One end of each connecting rod 5-204 is hinged with a slider 5-205 through a connecting rod pin b 5-203, and the other end is hinged with the branch ring 5-201 through a connecting rod pin b 5-203. The slider support ring 5-206 is an annular structure, which is fixed in the middle of the column 4 by nuts. The slider support ring 5-206 has N radial holes for mounting the slider 5-205.

During the extension of the supports, the piston rod of the cylinder b 5-101 drives the connecting rods 5-204 to move in the vertical direction through the branch ring 5-201. The vertical movement of the connecting rod 5-204 is converted into the horizontal movement of the slider 5-205 under the action of the rod slider mechanism. When the connecting rod 5-204 moves to the dead point in the vertical direction, the connecting rod 5-204 and the slider 5-205 are collinear, and the transmission angle is 0, and the support body realizes self-locking. Through the orthogonal structure design, the instability of support force caused by the compressibility of the gas when the cylinder piston rod and the support force are in the same direction can be avoided, and the support state can be safely and reliably maintained for a long time in a zero energy consumption manner. During the retracting of the supports, the piston rod of the cylinder b 5-101 drives the connecting rods 5-204 to move in the vertical direction through the branch ring 5-201, so that they reversely cross the critical point to complete the reset.

The adaptive support body assemblies 6 include a plurality of auxiliary support frames 6-1, a plurality of rubber support bodies 6-2 and a plurality of support fixing pins 6-3. The auxiliary support frames 6-1 are T-shaped. The support end of each auxiliary support frame 6-1 is connected with two rubber support bodies 6-2. The non-support end of each auxiliary support frame 6-1 is hinged with the end of a slider 5-205 through a support fixing pin 6-3. During the machining of the workpiece 7, the adaptive support body assemblies 6 can be rotated within a certain range to ensure an effective fit with the inner wall of the workpiece 7.

When the annular thin-walled parts are clamped, the workpiece is first placed on the positioning ring 2-3, and the air source is connected. At this time, the two manual reversing valves 3-108 are in the middle sealing state. And then, the two-position three-way manual reversing valve 8 and the manual reversing valve 3-108 in the pressure plate gas-path structure are successively opened to make the pressure plate pressing circuit work. A plurality of cylinders a 3-101 uniformly distributed along the circumferential direction drive the pressure plate boosting orthogonal self-locking mechanisms 3-2 to work, so that the pressure plates simultaneously press the bottom of the workpiece 7. The speed control valves a 3-103 are included in the pressure plate gas-path structures, which can avoid the damage of the T-shaped pressure plates 3-201 to the workpiece 7 in the process of pressing. After confirming that the workpiece 7 is pressed, the manual reversing valve 3-108 in the support gas-path structure is opened to make the support circuit work. The support synchronous orthogonal self-locking mechanisms 5-2 are pushed by the cylinder b 5-101 to support the weak positions of the inner wall of the workpiece 7. The anti-speed-out system SSC valve 5-103 is included in the support gas-path structure, which can avoid the damage to the workpiece 7 caused by the rapid extension of the adaptive support body assemblies 6 during the support process. After confirming that the workpiece 7 is supported, the two manual reversing valves 3-108 are set to the middle seal state, and then the air source can be removed for machining After the workpiece 7 is machined, the air source is reconnected, and the two-position three-way manual reversing valve 8 and the manual reversing valve 3-108 in the support circuit are successively opened to make the support synchronous orthogonal self-locking mechanisms 5-2 synchronously retract. Then, the manual reversing valve 3-108 in the pressure plate circuit is opened, so that the pressure plate boosting orthogonal self-locking mechanisms 3-2 are synchronously released. The rapid exhaust valves 3-111 are included in the support retraction circuit and the pressure plate release circuit respectively to ensure the quick disassembly of the workpiece 7.

For technicians in the field, the above description is only the preferred embodiment of the present invention, and the scope of the present invention is defined by the appended claims rather than the above description. Therefore, all changes in the meaning and scope of the equivalent elements of the claim of the invention should be included in the protection scope of the present invention.

The invention claimed is:

1. A synchronous self-locking pneumatic adaptive fixture used for machining of annular thin-wall parts, wherein the synchronous self-locking pneumatic adaptive fixture includes a zero point positioning system, a base body, a plurality of pressure plate mechanism assemblies, a plurality of columns, a plurality of support mechanism assemblies and a plurality of adaptive support body assemblies; the base body, the pressure plate mechanism assemblies and the columns are fixed on an upper surface of the zero point positioning system; the columns are sleeved with the support mechanism assemblies; an end of each support mechanism assembly is hinged with the adaptive support body assembly; clamping of the annular thin-walled parts is realized by the pressure plate mechanism assemblies and the support mechanism assemblies;

the zero point positioning system includes a base plate, a working plate, a plurality of zero point positioners and a plurality of zero point positioning joints; the base plate is a circular thin plate structure, and five zero point positioners are fixed on its upper surface along a circumference and a center of the base plate; the zero point positioning joints are installed on a bottom surface of the working plate; each zero point positioner is connected with a zero point positioning joint; the working plate is fixed on the base plate; the base body, the pressure plate mechanism assemblies and the columns are fixed on an upper surface of the working plate;

the base body includes a plurality of support columns, a base and a positioning ring; the working plate and the base are connected by the support columns; the base is an annular plate structure, which is connected with the positioning ring by bolts;

the pressure plate mechanism assemblies include a plurality of pressure plate gas-path structures and a plurality of pressure plate boosting orthogonal self-locking mechanisms;

the pressure plate gas-path structures include a plurality of cylinders I, a plurality of cylinder mounting frames, a plurality of speed control valves I, a plurality of joints, a plurality of joint brackets, a mounting plate, a plurality of mounting plate columns, a manual reversing valve, a plurality of relief valves, a plurality of relief valve mounting frames and a plurality of rapid exhaust valves; the cylinders I are double-acting cylinder, which are symmetrically fixed on the upper surface of the working plate through the cylinder mounting frames; an output end of the cylinders I point to the base body; the speed control valves I are installed in an exhaust port of the cylinders I; there are four joint brackets, which are symmetrically mounted on an upper surface of the mounting plate; the joints are fixed on the joint brackets in series; there are four mounting plate columns, one end of each column is fixed on the upper surface of the working plate by bolts, and an other end is fixed on the lower surface of the mounting plate; the manual reversing valve is a three-position, five-way, middle-sealed manual reversing valve, which is fixed on an edge of the working plate by bolts; each cylinder I is equipped with a relief valve which is fixed on the relief valve mounting frame; the relief valve mounting frames are fixed on the upper surface of the mounting plate by bolts; there are eight rapid exhaust valves, which are symmetrically fixed on the upper surface of the mounting plate;

the pressure plate boosting orthogonal self-locking mechanisms have a total of N, which are hinged with a piston rod of the cylinders I, and are carried out in the way of combining lever force increasing mechanisms and orthogonal self-locking mechanisms; each pressure plate boosting orthogonal self-locking mechanism includes a T-shaped pressure plate, an upper connecting rod, a connecting rod, a lower connecting rod, five connecting rod pins I, an auxiliary rod, a T-shaped pressure plate mounting column and an auxiliary rod mounting column; the T-shaped pressure plate mounting column is fixed on an upper surface of the positioning ring by bolts; the T-shaped pressure plate is hinged with the upper end of the T-shaped pressure plate mounting column through the connecting rod pin I in a pin hole of middle fulcrum, and a position of the fulcrum is determined according to a size of pressing force; a non-pressing end of the T-shaped pressure plate is hinged with an end of the upper connecting rod by the connecting rod pin I; the other end of the upper connecting rod and the end of the lower connecting rod are hinged together with the connecting rod by the connecting rod pin I; the other end of the lower connecting rod is hinged with one end of the auxiliary rod by the connecting rod pin I, and an other end of the auxiliary rod is hinged with a top of the auxiliary rod mounting column; the auxiliary rod mounting column is mounted on the upper surface of the working plate;

the column is a stepped structure, and a bottom of the column is a plate structure, which is fixed on the upper surface of the working plate by bolts; a top of the column passes through the cylinder mounting plate and is fixed; the support mechanism assemblies are sleeved on the columns;

the support mechanism assemblies include a plurality of support gas-path structures and a plurality of support synchronous orthogonal self-locking mechanisms;

the support gas-path structures include a cylinder II, a cylinder mounting plate, an anti-speed-out system SSC valve, a speed control valve II and a speed control valve bracket; the cylinder mounting plate is an annular plate installed on the top of the columns; the cylinder II is a double-acting cylinder, which is fixed on an upper surface of the cylinder mounting plate by bolts, and the piston rod of the cylinder II passes through the cylinder mounting plate; the speed control valve II is fixed on the upper surface of the cylinder mounting plate through the speed control valve bracket; the anti-speed-out system SSC valve is fixed on the upper surface of the cylinder mounting plate;

the support synchronous orthogonal self-locking mechanisms are carried out in the way of combining rod slider mechanisms and the orthogonal self-locking mechanisms; the support synchronous orthogonal self-locking mechanisms include a branch ring, two nuts, a plurality of connecting rod pins II, a plurality of connecting rods, a plurality of sliders and a slider support ring; the branch ring is fixed on a piston rod end of the cylinder II by the nuts; one end of each connecting rod is hinged with a slider through the connecting rod pin II, and the other end is hinged with the branch ring through a connecting rod pin II; the slider support ring is an annular structure, which is fixed in the middle of the column by nuts; the slider support ring has radial holes for mounting the slider;

the adaptive support body assemblies include a plurality of auxiliary support frames, a plurality of rubber support bodies and a plurality of support fixing pins; the auxiliary support frames are T-shaped; a support end of each auxiliary support frame is connected with two rubber support bodies; a non-support end of each auxiliary support frame is hinged with an end of a slide through a support fixing pin; during the machining of the workpiece, the adaptive support body assemblies are rotated to ensure an effective fit with an inner wall of the workpiece.

2. The synchronous self-locking pneumatic adaptive fixture used for the machining of annular thin-wall parts according to claim 1, wherein number N of the connecting rods is a natural number, and N≥6, which is determined according to a diameter of the supporting part of the annular thin-walled parts.

* * * * *